United States Patent
Kim et al.

(10) Patent No.: US 12,315,920 B2
(45) Date of Patent: May 27, 2025

(54) POSITIVE ELECTRODE ACTIVE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY INCLUDING THE SAME

(71) Applicant: LG Chem, Ltd., Seoul (KR)

(72) Inventors: Won Tae Kim, Daejeon (KR); Jong Yeol Yu, Daejeon (KR); Seoung Chul Ha, Daejeon (KR); Sun Sik Shin, Daejeon (KR); Hong Kyu Park, Daejeon (KR); Seong Hoon Kang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1077 days.

(21) Appl. No.: 17/055,233

(22) PCT Filed: Jun. 27, 2019

(86) PCT No.: PCT/KR2019/007833
§ 371 (c)(1),
(2) Date: Nov. 13, 2020

(87) PCT Pub. No.: WO2020/004988
PCT Pub. Date: Jan. 2, 2020

(65) Prior Publication Data
US 2021/0218021 A1  Jul. 15, 2021

(30) Foreign Application Priority Data
Jun. 28, 2018 (KR) .................. 10-2018-0074990

(51) Int. Cl.
*H01M 4/485* (2010.01)
*C01G 53/82* (2025.01)
(Continued)

(52) U.S. Cl.
CPC ............ *H01M 4/485* (2013.01); *C01G 53/82* (2025.01); *H01M 4/505* (2013.01); *H01M 4/62* (2013.01);
(Continued)

(58) Field of Classification Search
CPC ........ H01M 4/485; H01M 4/505; H01M 4/62; H01M 10/052; C01P 2004/61; C01P 2002/52; C01P 2002/60; C01G 53/006
See application file for complete search history.

(56) References Cited

U.S. PATENT DOCUMENTS

| | | |
|---|---|---|
| 2002/0192148 A1 | 12/2002 | Kweon et al. |
| 2004/0265216 A1 | 12/2004 | Nazri et al. |

(Continued)

FOREIGN PATENT DOCUMENTS

| | | |
|---|---|---|
| CN | 101944610 A | 1/2011 |
| CN | 104396066 A | 3/2015 |

(Continued)

OTHER PUBLICATIONS

Zhang et al., "Investigation on performance of Li(Ni0.5Co0.2Mn0.3) 1-xTixO2 cathode materials for lithium-ion battery", Science Direct, Ceramics International, Available Online Apr. 6, 2015, vol. 41, pp. 9069-9077.

(Continued)

*Primary Examiner* — Matthew T Martin
*Assistant Examiner* — Unique Luna Williams
(74) *Attorney, Agent, or Firm* — Lerner David LLP

(57) ABSTRACT

A positive electrode active material for a lithium secondary battery includes a lithium composite transition metal oxide including transition metals including nickel (Ni), cobalt (Co), and manganese (Mn), and the lithium composite transition metal oxide is doped with doping elements including cobalt (Co) and titanium (Ti). The lithium composite (Continued)

transition metal oxide includes at least one lithium layer and at least one transition metal layer including the transition metals, and the lithium layer and the transition metal layer are alternately arranged. The thickness of the lithium layer ranges from 2.146 Å to 2.182 Å, and the thickness of the transition metal layer ranges from 2.561 Å to 2.595 Å.

10 Claims, 3 Drawing Sheets

(51) Int. Cl.
*H01M 4/505* (2010.01)
*H01M 4/62* (2006.01)
*H01M 10/052* (2010.01)

(52) U.S. Cl.
CPC ....... *H01M 10/052* (2013.01); *C01P 2002/52* (2013.01); *C01P 2002/60* (2013.01); *C01P 2004/61* (2013.01)

(56) References Cited

U.S. PATENT DOCUMENTS

| | | | |
|---|---|---|---|
| 2013/0344386 A1 | 12/2013 | Kim et al. | |
| 2014/0158932 A1 | 6/2014 | Sun et al. | |
| 2014/0322605 A1 | 10/2014 | Oh et al. | |
| 2015/0188121 A1* | 7/2015 | Lee | H01M 4/621 |
| | | | 252/182.1 |
| 2016/0172671 A1 | 6/2016 | Yoo et al. | |
| 2016/0336595 A1 | 11/2016 | Choi et al. | |
| 2017/0293707 A1* | 10/2017 | Xin | H01M 4/505 |
| 2018/0108937 A1* | 4/2018 | Drach | H01M 10/0569 |
| 2018/0175368 A1 | 6/2018 | Zhou et al. | |
| 2018/0351174 A1 | 12/2018 | Paulsen et al. | |
| 2019/0296347 A1 | 9/2019 | Sakai | |

FOREIGN PATENT DOCUMENTS

| | | |
|---|---|---|
| CN | 106532005 A | 3/2017 |
| CN | 108140828 A | 6/2018 |
| JP | 2014116161 A | 6/2014 |
| JP | 2015519005 A | 7/2015 |
| JP | 6202205 B2 | 9/2017 |
| JP | 2018529195 A | 10/2018 |
| KR | 100406816 B1 | 11/2003 |
| KR | 20060026055 A | 3/2006 |
| KR | 20120044651 A | 5/2012 |
| KR | 20140018543 A | 2/2014 |
| KR | 20150004034 A | 1/2015 |
| KR | 101510940 B1 | 4/2015 |
| KR | 20160073178 A | 6/2016 |
| KR | 101757628 B1 | 7/2017 |
| KR | 20180038580 A | 4/2018 |
| KR | 20180070435 A | 6/2018 |
| WO | 2015186325 A1 | 12/2015 |
| WO | 2017204164 A1 | 11/2017 |

OTHER PUBLICATIONS

International Search Report for Application No. PCT/KR2019/007833 mailed Oct. 1, 2019, 2 pages.
Extended European Search Report including Written Opinion for Application No. 19824545.8 dated May 12, 2021, 8 pages.

\* cited by examiner

POSITIVE ELECTRODE ACTIVE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY INCLUDING THE SAME

CROSS-REFERENCE TO RELATED APPLICATION

This application is a national phase entry under 35 U.S.C. § 371 of International Application No. PCT/KR2019/007833 filed Jun. 27, 2019, which claims priority to and the benefit of Korean Patent Application No. 10-2018-0074990, filed on Jun. 28, 2018, the disclosures of which are incorporated herein by reference in their entirety.

TECHNICAL FIELD

The present invention relates to a positive electrode active material for a lithium secondary battery, a method of preparing the same, and a positive electrode for a lithium secondary battery and a lithium secondary battery including the same.

BACKGROUND ART

Recently, with the rapid spread of electronic devices using batteries, such as a mobile phone, a notebook computer, an electric vehicle, and the like, the demand for a secondary battery that is small in size and light in weight but has a relatively high capacity is rapidly increasing. In particular, lithium secondary batteries are light in weight and have a high energy density, and thus are receiving the spotlight as a driving power source for portable devices. Accordingly, efforts on research and development for improving the performance of the lithium secondary battery have been actively made.

Lithium secondary batteries produce electric energy by oxidation and reduction reactions occurring when lithium ions are intercalated into and deintercalated from positive and negative electrodes while an organic electrolyte solution or a polymer electrolyte solution is filled between the positive and negative electrodes, which consist of an active material enabling the intercalation and deintercalation of lithium ions.

As a positive electrode active material for the lithium secondary battery, a lithium cobalt oxide ($LiCoO_2$) is mainly used, and other than this, the use of a lithium manganese oxide such as $LiMnO_2$ with a layered crystal structure or $LiMn_2O_4$ with a spinel crystal structure, a lithium nickel oxide ($LiNiO_2$), and the like is also considered.

Among the positive electrode active materials, $LiCoO_2$ is most widely used due to excellent lifespan characteristics and charge/discharge efficiency, but $LiCoO_2$ has disadvantages such as poor high-temperature stability and a high price due to use of cobalt as a limited mineral resource, resulting in a limitation in price competitiveness.

Lithium manganese oxides such as $LiMnO_2$, $LiMn_2O_4$, and the like have advantages such as excellent thermal stability, a low price, and easy synthesis, but have problems such as low capacity, poor high-temperature characteristics, and low conductivity.

Further, lithium nickel oxides such as $LiNiO_2$ and the like are relatively cheap and have a battery characteristic of high discharge capacity, but show a rapid phase transition in crystalline structure caused by a change in volume during a charge/discharge cycle and have a problem of drastically reduced stability when exposed to air and moisture.

Accordingly, recently, a lithium composite transition metal oxide in which a part of nickel is substituted with another transition metal such as manganese, cobalt, and the like has been proposed as an alternative material. In particular, such a lithium composite transition metal oxide containing nickel at a high content has an advantage of excellent capacity characteristics, but even in such a case, when a battery is used for a long time or is driven with a high voltage, the cycle characteristics are drastically deteriorated and some problems such as battery swelling due to gas generation, degradation of structural stability or thermal stability due to reduced chemical stability or the like are not sufficiently solved.

Therefore, there is a high need for a positive electrode active material having excellent cycle characteristics and structural stability while exhibiting improved capacity and output characteristics.

PRIOR ART DOCUMENT

Patent Document

Korean Patent Publication No. 10-1510940

DISCLOSURE

Technical Problem

The present invention is directed to providing a positive electrode active material for a lithium secondary battery, which is doped with specific doping elements and has a layered structure having a lithium layer and a transition metal layer in a specific range in thickness, thereby improving structural stability and durability, and also improving output, capacity, and cycle characteristics of a battery.

The present invention is also directed to providing a method of preparing the above-described positive electrode active material for a lithium secondary battery.

The present invention is also directed to providing a positive electrode for a lithium secondary battery and a lithium secondary battery, which include the above-described positive electrode active material for a lithium secondary battery.

Technical Solution

One aspect of the present invention provides a positive electrode active material for a lithium secondary battery that is a lithium composite transition metal oxide including transition metals including nickel (Ni), cobalt (Co), and manganese (Mn), wherein the lithium composite transition metal oxide is doped with doping elements including cobalt (Co) and titanium (Ti), the lithium composite transition metal oxide includes at least one lithium layer and at least one transition metal layer including the transition metals, the lithium layer and the transition metal layer are alternately arranged, a thickness of the lithium layer is in a range of 2.146 Å to 2.182 Å, and a thickness of the transition metal layer is in a range of 2.561 Å to 2.595 Å.

Another aspect of the present invention provides a method of preparing the above-described positive electrode active material for a lithium secondary battery, the method including preparing a precursor mixture by mixing a transition metal hydroxide precursor including transition metals including nickel (Ni), cobalt (Co), and manganese (Mn), a cobalt doping source, and a titanium doping source, mixing the precursor mixture with a lithium precursor and performing a first heat treatment at 600° C. to 900° C., and preparing a lithium composite transition metal oxide by performing a second heat treatment at 800° C. to 1,000° C. after the first heat treatment.

Still another aspect of the present invention provides a positive electrode for a lithium secondary battery including the above-described positive electrode active material for a lithium secondary battery.

Yet another aspect of the present invention provides a lithium secondary battery including the above-described positive electrode for a lithium secondary battery.

Advantageous Effects

A positive electrode active material for a lithium secondary battery of the present invention includes specific doping elements doped thereinto and has a layered structure having a lithium layer and a transition metal layer in a specific range in thickness. Accordingly, structural stability and durability of an active material can be improved to an excellent level, and particularly, when it is applied to the positive electrode active material containing nickel at a high content, capacity and output characteristics can be improved, and simultaneously an effect of improving cycle characteristics due to the effect of improving the structural stability and durability can be obtained.

MODES OF THE INVENTION

Figure 1:
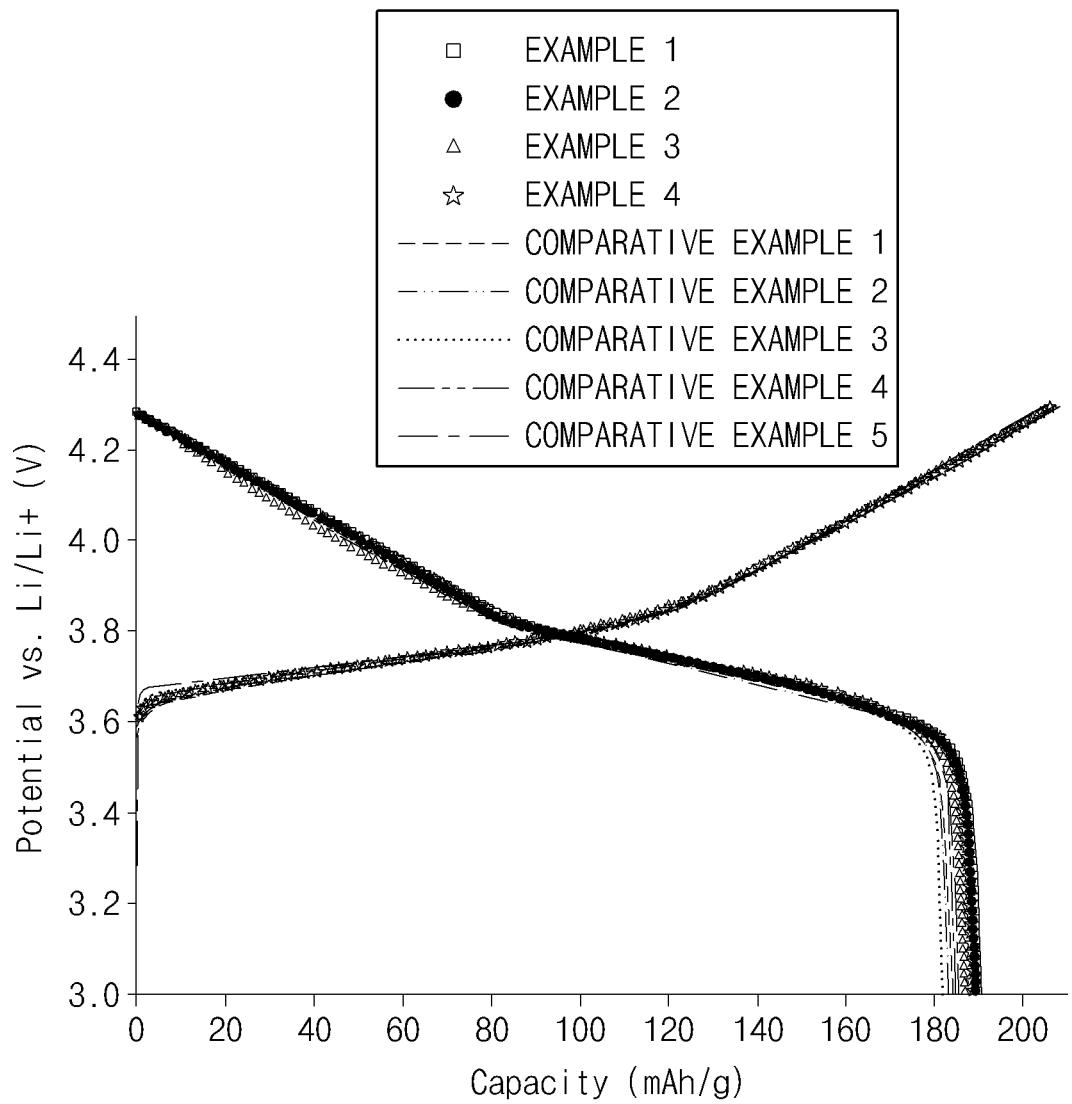
FIG. 1 is a graph illustrating the evaluation of capacity characteristics of lithium secondary batteries of the Examples and Comparative Examples.

The terms and words used in the present specification and claims should not be construed as limited to general or dictionary terms and should be interpreted with the meaning and concept in accordance with the technical idea of the present invention based on the technical spirit that the inventors have appropriately defined the concepts of terms in order to explain the invention in the best way.

The terms used in the present specification are only used to describe specific various embodiments and are not intended to limit the present invention. As used herein, singular forms are intended to include plural forms as well, unless the context clearly indicates otherwise.

It should be understood that the terms "comprises," "comprising," "includes," "including," "contains," "containing," "has," and/or "having," when used herein, specify the presence of stated features, integers, steps, operations, elements, components and/or combinations thereof, but do not preclude the presence or addition of one or more other features, integers, steps, operations, elements, components and/or combinations thereof.

In the present specification, "%" represents weight percentages unless otherwise indicated.

Hereinafter, the present invention will be described in detail.

Positive Electrode Active Material for Lithium Secondary Battery

A positive electrode active material for a lithium secondary battery according to the present invention is a lithium composite transition metal oxide including transition metals including nickel (Ni), cobalt (Co), and manganese (Mn), and the lithium composite transition metal oxide is doped with doping elements including cobalt (Co) and titanium (Ti) and includes at least one lithium layer and at least one transition metal layer including the transition metals. In addition, the lithium layer and the transition metal layer are alternately arranged, and a thickness of the lithium layer is in a range of 2.146 Å to 2.182 Å and a thickness of the transition metal layer is in a range of 2.561 Å to 2.595 Å.

The positive electrode active material for a lithium secondary battery according to the present invention has doping elements including cobalt and titanium doped thereinto. Since cobalt and titanium are simultaneously doped into the positive electrode active material for a lithium secondary battery, the positive electrode active material for a lithium secondary battery may have improved capacity characteristics, excellent durability, and structural stability, so that a long lifespan may be expected.

Further, the positive electrode active material for a lithium secondary battery according to the present invention includes a lithium composite transition metal oxide including at least one lithium layer and at least one transition metal layer, and the thickness of each of the lithium layer and the transition metal layer is controlled to a specific range. Accordingly, the transfer resistance of lithium may be lowered to improve output and capacity characteristics and the binding force between transition metal and oxygen may be increased to prevent deintercalation of oxygen and to preferably improve structural stability.

The positive electrode active material for a lithium secondary battery according to the present invention is a lithium composite transition metal oxide.

The lithium composite transition metal oxide includes transition metals including nickel (Ni), cobalt (Co), and manganese (Mn).

The lithium composite transition metal oxide may be a high-Ni lithium composite transition metal oxide in which the content of nickel (Ni) among the entire transition metal elements contained in the lithium composite transition metal oxide is 60 mol % or more. More preferably, the content of nickel (Ni) among the entire transition metal elements may be 65 mol % or more. When the high-Ni lithium composite transition metal oxide in which the content of nickel (Ni) among the entire transition metal elements is 60 mol % or more is used as in the present invention, a higher capacity may be secured.

The lithium composite transition metal oxide may be a lithium composite transition metal oxide having a ratio (Li/Me) of the number of moles of lithium (Li) to the total number of moles of transition metals of 1 or more, and thus the capacity and output characteristics of the battery may be improved.

Specifically, in the lithium composite transition metal oxide, the ratio (Li/Me) of the number of moles of lithium (Li) to the total number of moles of the transition metals of may be in a range of 1 to 1.5, specifically in a range of 1 to 1.15, and more specifically in a range of 1.05 to 1.1. When the ratio (Li/Me) is within the above-described range, it is preferable in terms of excellent capacity and output characteristics of the battery.

The lithium composite transition metal oxide may be a compound represented by Chemical Formula 1 below.

$$Li_{1+p}Ni_{1-(x+y+z)}Co_xMn_yM_zO_{2+q}$$ [Chemical Formula 1]

in Chemical Formula 1, $0 \leq p \leq 0.5$, $0 < x \leq 0.3$, $0 < y \leq 0.3$, $0 < z \leq 0.1$, $-0.2 \leq q \leq 0.2$, and ($<x+y+z \leq 0.4$, and M is a doping element.

In the lithium composite transition metal oxide of Chemical Formula 1, Li may be included at a content corresponding to 1+p, that is, $0 \leq p \leq 0.5$, specifically $0 \leq p \leq 0.15$, and more specifically $0.05 \leq p < 0.1$. Within the above-described range, the output and capacity characteristics of the battery may be improved to a remarkable level.

In the lithium composite transition metal oxide of Chemical Formula 1, Ni may be contained at a content corresponding to 1−(x+y+z), that is, $0.6 \leq 1-(x+y+z) < 1$ and specifically $0.65 \leq 1-(x+y+z) < 1$, and accordingly, the high capacity of the battery may be secured.

In the lithium composite transition metal oxide of Formula 1, Co may be contained at a content corresponding to x, that is, $0 < x \leq 0.3$. When x in Chemical Formula 1 exceeds 0.3, costs may be increased.

In the lithium composite transition metal oxide of Formula 1, Mn may improve the stability of the active material, and as a result, the stability of the battery may be enhanced. In consideration of the effect of improving lifespan characteristics, Mn may be contained at a content corresponding to y, that is, $0 < y \leq 0.3$. When y in Chemical Formula 1 exceeds 0.3, the output characteristics and capacity characteristics of the battery may be rather degraded.

In the lithium composite transition metal oxide of Chemical Formula 1, M is the doping element including cobalt and titanium. M may be contained at a content corresponding to z, that is, $0 < z \leq 0.1$.

In the lithium composite transition metal oxide of Chemical Formula 1, O may be contained at a content corresponding to 2+q, that is, $-1.8 \leq 2+q \leq 2.2$, and preferably $-1.85 \leq 2+q \leq 2.15$ in consideration of the excessive addition of Li.

The lithium composite transition metal oxide may include at least one lithium layer and at least one transition metal layer. The lithium layer may function as a layer in which lithium is intercalated thereinto and deintercalated therefrom in a charging and discharging process. The transition metal layer may include the transition metals.

The lithium layer and the transition metal layer may be alternately arranged, and thus the lithium composite transition metal oxide may include a layered crystal structure in which a lithium layer and a transition metal layer are alternately arranged.

In the lithium layer and the transition metal layer that are alternately arranged, the thickness (i.e., $LiO_6$ slab thickness) of the lithium layer may be in a range of 2.146 Å to 2.182 Å, preferably 2.155 Å to 2.175 Å, and more preferably 2.166 Å to 2.17 Å, and the thickness (i.e., $TMO_6$ slab thickness) of the transition metal layer may be in a range of 2.561 Å to 2.595 Å, preferably 2.565 Å to 2.585 Å, and more preferably 2.57 Å to 2.577 Å.

Since the lithium layer has the thickness within the above-described range, the intercalation/deintercalation path of lithium may be sufficiently secured, so that the transfer resistance of lithium ions may be lowered and the output characteristics of the battery may be improved. In addition, since the transition metal layer has the thickness within the above-described range, the attraction between the transition metal and oxygen may be sufficiently secured, and accordingly, the phenomenon of oxygen deintercalation from the active material during the charging and discharging of the battery may be effectively prevented, thereby realizing the effect of simultaneously improving output characteristics, capacity characteristics, and cycle characteristics of the battery. The method of implementing the lithium layer and the transition metal layer to have the above-described thickness is not particularly limited, it may be implemented, for example, by appropriately adjusting the doping elements and content thereof, which will be described below.

The thickness of each of the lithium layer and the transition metal layer may be measured, for example, using an X-ray diffraction (XRD) analysis.

The doping elements are doped into the lithium composite transition metal oxide. In addition, the doping elements include cobalt (Co) and titanium (Ti).

In the present invention, since the doping elements including cobalt and titanium are doped into the lithium composite transition metal oxide, the capacity characteristics of the battery may be further improved, and the rigidity, durability, and structural stability of particles may be improved. Therefore, it is possible to implement an active material having a high capacity, a high lifespan, and high durability, and particularly, it is possible to exhibit stable battery performance at a high voltage.

In addition, the doping elements according to the present invention are doped into the lithium composite transition metal oxide to perform a role of controlling the thickness of each of the lithium layer and the transition metal layer in the lithium composite transition metal oxide having a layered crystal structure. For example, the doping elements may perform the role of narrowing the transition metal layer while relatively widening the lithium layer in the structure in which the lithium layer and the transition metal layer are alternately arranged. Accordingly, in the positive electrode active material for a lithium secondary battery, due to the doping elements, the intercalation/deintercalation path of the lithium layer may be sufficiently secured and the transfer resistance of the lithium ions may be reduced to improve the output characteristics of the battery, and the attraction between the transition metal and oxygen is increased so that the phenomenon of oxygen deintercalation from the active material may be effectively prevented to improve the lifespan characteristics and structural stability of the active material.

Among the doping elements, the cobalt is a component that may improve the capacity characteristics of the battery by being doped into the lithium composite transition metal oxide.

Among the doping elements, the cobalt may be contained in an amount of 2,500 ppm to 4,500 ppm, and preferably 2,800 ppm to 4,000 ppm with respect to the total weight of the lithium composite transition metal oxide. Within the above-described range, the effect of improving the capacity characteristics of the battery may be preferably realized, the conductivity of the active material may be improved, and a cation mixing phenomenon may be effectively prevented.

Among the doping elements, the titanium is a component that may improve the durability and structural stability of the active material by being doped into the lithium composite transition metal oxide.

Among the doping elements, the titanium may be contained in an amount of 100 ppm to 1,000 ppm, preferably 250 ppm to 800 ppm, and more preferably 280 ppm to 650 ppm with respect to the total weight of the lithium composite transition metal oxide. Within the above-described range, the durability of the active material may be effectively improved, and the effect of improving the capacity and lifespan characteristics of the battery may be maximized The doping elements may include the cobalt and the titanium at a weight ratio of 75:25 to 95:5, preferably 80:20 to 92:8, and more preferably 82:18 to 85:15. When the cobalt and the titanium are included in the doping elements within the above-described range, the effect of simultaneously improving the above-described capacity, output, and durability may be preferably realized.

The positive electrode active material for a lithium secondary battery may have a crystallite size in an a-axis direction of 2.862 Å to 2.8715 Å, and preferably 2.866 Å to 2.870 Å, and a crystallite size in a c-axis direction of 14.220 Å to 14.236 Å, and preferably 14.227 Å to 14.234 Å, which are measured by XRD analysis. Within the above-described range, the aforementioned effects may be more preferably realized, and it is preferable in terms of improving discharge capacity, lifespan retention rate, and low-temperature output.

The positive electrode active material for a lithium secondary battery may have an average particle size ($D_{50}$) of 9 μm to 20 μm, and preferably 12 μm to 17 μm. The above-described range is more preferable in terms of realizing the aforementioned effects and preferable in terms of improving the rollability of the positive electrode active material.

Method of Preparing Positive Electrode Active Material for Lithium Secondary Battery Further, the present invention provides a method of preparing a positive electrode active material for a lithium secondary battery.

The method of preparing the positive electrode active material for a lithium secondary battery according to the present invention includes preparing a precursor mixture by mixing a transition metal hydroxide precursor including transition metals including nickel (Ni), cobalt (Co), and manganese (Mn), a cobalt doping source, and a titanium doping source, mixing the precursor mixture with a lithium precursor and performing a first heat treatment at 600° C. to 900° C., and preparing a lithium composite transition metal oxide by performing a second heat treatment at 800° C. to 1,000° C. after the first heat treatment.

The above-described positive electrode active material for a lithium secondary battery may be prepared according to the method of preparing a positive electrode active material for a lithium secondary battery of the present invention. According to the method of preparing a positive electrode active material for a lithium secondary battery, doping elements including cobalt and titanium may be doped into a lithium composite transition metal oxide at a specific content, so that the capacity characteristics of the battery may be improved, and at the same time, the durability, rigidity, and structural stability of the active material may be improved and the lifespan characteristics of the battery may be improved to an excellent level.

The method of preparing the positive electrode active material for a lithium secondary battery according to the present invention includes preparing a precursor mixture by mixing a transition metal hydroxide precursor including transition metals including nickel (Ni), cobalt (Co), and manganese (Mn), a cobalt doping source, and a titanium doping source.

The transition metal hydroxide precursor includes transition metals including nickel (Ni), cobalt (Co), and manganese (Mn).

The transition metal hydroxide precursor may be a high-Ni transition metal hydroxide in which the content of nickel (Ni) among the entire transition metal elements contained in the transition metal hydroxide precursor is 60 mol % or more. More preferably, the content of nickel (Ni) among the entire transition metal elements may be 65 mol % or more. When a high-Ni transition metal hydroxide precursor in which the content of nickel (Ni) among the entire transition metal elements is 60 mol % or more as in the present invention is used, a positive electrode active material for a lithium secondary battery having a higher capacity may be prepared.

Specifically, the transition metal hydroxide precursor may be a compound represented by Chemical Formula 2 below.

$Ni_{1-(x1+y1)}Co_{x1}Mn_{y1}(OH)_2$     [Chemical Formula 2]

in Chemical Formula 2, 0<x1≤0.3, 0<y1≤0.3, and 0<x1+y1≤0.4.

In Chemical Formula 2, x1 and y1 may be the same as x and y described in Chemical Formula 1, respectively.

The transition metal hydroxide precursor may be prepared by a coprecipitation reaction of a metal solution including a nickel (Ni)-containing raw material, a cobalt (Co)-containing raw material, and a manganese (Mn)-containing raw material.

The nickel (Ni)-containing raw material may be, for example, a nickel-containing acetate, nitrate, sulfate, halide, sulfide, hydroxide, oxide, oxyhydroxide, or the like, and specific examples thereof include $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, fatty acid nickel salts, nickel halides, or a combination thereof, but the present invention is not limited thereto.

The cobalt (Co)-containing raw material may be a cobalt-containing acetate, nitrate, sulfate, halide, sulfide, hydroxide, oxide, oxyhydroxide, or the like, and specific examples thereof include $Co(OH)_2$, CoOOH, $Co(OCOCH_3)_2 \cdot 4H_2O$, $Co(NO_3)_2 \cdot 6H_2O$, $Co(SO_4)_2 \cdot 7H_2O$, or a combination thereof, but the present invention is not limited thereto.

The manganese (Mn)-containing raw material may be, for example, a manganese-containing acetate, nitrate, sulfate, halide, sulfide, hydroxide, oxide, oxyhydroxide, or a combination thereof, and specific examples thereof include manganese oxides such as $Mn_2O_3$, $MnO_2$, $Mn_3O_4$, and the like, manganese salts such as $MnCO_3$, $Mn(NO_3)_2$, $MnSO_4$, $MnSO_4 \cdot H_2O$, manganese acetate, manganese dicarboxylate, manganese citrate, and manganese fatty acid salts, manganese oxyhydroxide, manganese chloride, or a combination thereof, but the present invention is not limited thereto.

The metal solution may be prepared by dissolving the nickel (Ni)-containing raw material, the cobalt (Co)-containing raw material, and the manganese (Mn)-containing raw material in a solvent, specifically, water or a mixed solvent of water and an organic solvent (specifically, alcohol or the like) that may be uniformly mixed with water, or may be prepared by mixing aqueous solutions of the nickel (Ni)-containing raw material, the cobalt (Co)-containing raw material, and the manganese (Mn)-containing raw material.

The transition metal hydroxide precursor may be prepared by adding an ammonium cation-containing complex-forming agent, which may be $NH_4OH$, $(NH_4)_2SO_4$, $NH_4NO_3$, $NH_4Cl$, $CH_3COONH_4$, $NH_4CO_3$, or a combination of two or more thereof, and a basic compound, which may be a hydroxide of an alkali metal or alkaline earth metal such as NaOH, KOH or $Ca(OH)_2$, or a hydrate thereof or a combination of two or more thereof, to the metal solution, followed by a coprecipitation reaction.

Meanwhile, the coprecipitation reaction may be performed under an inert atmosphere such as nitrogen or argon at a temperature of 25° C. to 70° C.

The cobalt doping source and the titanium doping source are raw materials for forming doping elements including cobalt and titanium doped into the positive electrode active material for a lithium secondary battery.

The cobalt doping source may be at least one selected from the group consisting of $Co(OH)_2$, $Co_2O_3$, $Co_3(PO_4)_2$, $CoF_3$, $CoOOH$, $Co(OCOCH_3)_2 \cdot 4H_2O$, $Co(NO_3) \cdot 6H_2O$, $Co_3O_4$, $Co(SO_4)_2 \cdot 7H_2O$, and $CoC_2O_4$, and may preferably be $Co(OH)_2$.

The titanium doping source may be at least one selected from the group consisting of $TiO_2$, $Ti(OBu)_4$, $TiB_2$, TiC, $TiF_3$, $Ti(NO_3)_4$, $TiCl_2$, and $Ti_4P_3$, and may preferably be $TiO_2$.

The cobalt doping source may be mixed at 0.43 to 0.8 parts by weight, and preferably 0.48 to 0.7 parts by weight with respect to 100 parts by weight of the transition metal hydroxide precursor, and the titanium doping source may be mixed at 0.03 to 0.2 parts by weight, and preferably 0.045 to 0.15 parts by weight with respect to 100 parts by weight of the transition metal hydroxide precursor. Within the above-described range, the aforementioned content range of the doping elements of the positive electrode active material for a lithium secondary battery may be preferably implemented, and accordingly, it is possible to prepare a positive electrode active material for a lithium secondary battery by which capacity characteristics, lifespan characteristics, and durability of the battery may be simultaneously improved.

The cobalt doping source and the titanium doping source may be mixed at a weight ratio of 75:25 to 95:5, preferably 80:20 to 92:8, and more preferably 82:18 to 85:15. When the cobalt doping source and the titanium doping source are mixed within the above-described range, the effect of simultaneously improving the aforementioned capacity, output, and durability may be preferably realized.

The method of preparing the positive electrode active material for a lithium secondary battery according to the present invention includes mixing the precursor mixture with a lithium precursor and performing a first heat treatment at 600° C. to 900° C.

A lithium precursor or lithium may be uniformly dispersed and mixed in the mixture through the first heat treatment, and thus a positive electrode active material with excellent development of crystal grains may be implemented.

The temperature of the first heat treatment may be in a range of 600° C. to 900° C. and preferably 700° C. to 800° C., and mixtures may be uniformly dispersed and mixed within the above-described range.

The first heat treatment may be performed for three hours to seven hours and preferably four hours to six hours, and mixtures may be uniformly dispersed and mixed within the above-described range.

The first heat treatment may be performed in an oxygen atmosphere in terms of preventing the excessive generation of lithium impurities and producing a lithium composite transition metal oxide with excellent crystal grain development.

The lithium precursor may be a lithium-containing carbonate (e.g., $Li_2CO_3$ or the like), a lithium-containing hydrate (e.g., lithium hydroxide I hydrate ($LiOH \cdot H_2O$) or the like), a lithium-containing hydroxide (e.g., lithium hydroxide or the like), a lithium-containing nitrate (e.g., lithium nitrate ($LiNO_3$), a lithium-containing chloride (e.g., LiCl or the like), and the like, which may be used alone or in a mixture of two or more thereof.

The method of preparing the positive electrode active material for a lithium secondary battery according to the present invention includes preparing a lithium composite transition metal oxide by performing a second heat treatment at 800° C. to 1,000° C. after the first heat treatment.

The above-described lithium composite transition metal oxide, that is, a lithium composite transition metal oxide doped with doping elements including cobalt and titanium, may be prepared through the second heat treatment. The lithium composite transition metal oxide may be a positive electrode active material for a lithium secondary battery having a layered crystal structure in which a lithium layer and a transition metal layer each having the aforementioned thickness are alternately arranged.

The second heat treatment may be performed at a temperature of 800° C. to 1,000° C., and preferably 820° C. to 950° C., and accordingly, the above-described positive electrode active material for a lithium secondary battery may be easily formed. In addition, the size of a $Ni^{2+}$ ion and the size of a $Li^+$ ion are similar to each other, and thus a phenomenon in which the positions of the two ions are partially changed, that is, a cation mixing phenomenon, which is a phenomenon in which Ni atoms to be present in the transition metal layer enter the Li layer, may be effectively prevented.

The second heat treatment may be performed for eight hours to 12 hours, and preferably nine hours to 11 hours in terms of preferably implementing the above-described crystal structure of the positive electrode active material for a lithium secondary battery.

The second heat treatment may be performed in an oxygen atmosphere or an atmospheric atmosphere in terms of improving the structural stability of the active material by improving the bulk density and crystallinity of the formed positive electrode active material while improving the high-temperature stability of the active material by suppressing the residual raw material in the particles.

The method of preparing the positive electrode active material for a lithium secondary battery of the present invention may further include pulverizing and classifying the prepared positive electrode active material for a lithium secondary battery after the second heat treatment.

Cobalt is doped into the lithium composite transition metal oxide at 2,500 ppm to 4,500 ppm, and preferably 2,800 ppm to 4,000 ppm with respect to the total weight of the lithium composite transition metal oxide, and titanium is doped into the lithium composite transition metal oxide at 100 ppm to 1,000 ppm, preferably 250 ppm to 800 ppm, and more preferably 280 ppm to 650 ppm with respect to the total weight of the lithium composite transition metal oxide, so that a positive electrode active material having high durability and excellent conductivity may be prepared.

Positive Electrode for Lithium Secondary Battery

Further, the present invention provides a positive electrode for a lithium secondary battery including the positive electrode active material for a lithium secondary battery.

Specifically, the positive electrode for a lithium secondary battery includes a positive electrode current collector and a positive electrode active material layer formed on the positive electrode current collector and including the positive electrode active material for a lithium secondary battery.

In the positive electrode for a lithium secondary battery, the positive electrode current collector is not particularly limited as long as it has conductivity without causing chemical changes in the battery, and for example, stainless steel, aluminum, nickel, titanium, calcined carbon or aluminum or stainless steel that is surface-treated with carbon, nickel, titanium, silver, or the like may be used. In addition, the positive electrode current collector may generally have a thickness of 3 μm to 500 μm, and fine irregularities may be formed on a surface of the positive electrode current collector to increase the adhesion of the positive electrode active material. For example, the positive electrode current collector may be used in various forms such as a film, a sheet, a foil, a net, a porous body, a foamed body, a nonwoven fabric, and the like.

The positive electrode active material layer may include a conductive material and a binder in addition to the above-described positive electrode active material for a lithium secondary battery.

The conductive material is used to impart conductivity to an electrode, and thus any one that has electronic conductivity without causing a chemical change in the battery can be used without particular limitation. Specific examples thereof may include graphite such as natural or artificial graphite, a carbon-based material such as carbon black, acetylene black, Ketjen black, channel black, furnace black, lamp black, thermal black, or carbon fiber; a metal powder or metal fiber formed of copper, nickel, aluminum or silver; a conductive whisker such as zinc oxide or potassium titanate, a conductive metal oxide such as titanium oxide; or a conductive polymer such as a polyphenylene derivative, which may be used alone or in a mixture of two or more thereof. The conductive material may be included in an amount of 1 to 30 wt % based on the total weight of the positive electrode active material layer.

The binder serves to improve the adhesion between the positive electrode active material particles and the adhesion between the positive electrode active material and the positive electrode current collector. Specific examples thereof include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinyl pyrrolidone, tetrafluoroethylene, polyethylene, polypropylene, an ethylene propylene diene polymer (EPDM), a sulfonated EPDM, styrene butadiene rubber (SBR), a fluororubber, various copolymers thereof and the like, which may be used alone or in a mixture of two or more thereof. The binder may be included in an amount of 1 to 30 wt % based on the total weight of the positive electrode active material layer.

The positive electrode for a lithium secondary battery may be manufactured according to a conventional method of manufacturing a positive electrode except for using the above-described positive electrode active material. Specifically, the positive electrode may be manufactured by coating a positive electrode current collector with a composition for forming a positive electrode active material layer including the above-described positive electrode active material, and selectively, a binder and a conductive material, and performing drying and rolling. Here, the type and content of each of the positive electrode active material, the binder, and the conductive material are the same as described above.

The solvent may be a solvent generally used in the art, and examples thereof include dimethyl sulfoxide (DMSO), isopropyl alcohol, N-methylpyrrolidone (NMP), acetone, water, or the like, which may be used alone or in a mixture of two or more thereof. The amount of the solvent to be used may be suitably adjusted in consideration of coating thickness of a slurry and production yield to be enough to dissolve or disperse the positive electrode active material, the conductive material, and the binder, and have a viscosity capable of exhibiting excellent thickness uniformity when coated to manufacture the positive electrode.

Further, as another method, the positive electrode for a lithium secondary battery may be manufactured by casting the composition for forming a positive electrode active material layer on a separate support and then laminating a film peeled from the support on the positive electrode current collector.

Lithium Secondary Battery

Further, the present invention provides an electrochemical device including the positive electrode for a lithium secondary battery. Specifically, the electrochemical device may be a battery or a capacitor, and more specifically, may be a lithium secondary battery.

Specifically, the lithium secondary battery includes a positive electrode, a negative electrode positioned opposite to the positive electrode, a separator interposed between the positive electrode and the negative electrode, and an electrolyte, and the positive electrode is the same as the above-described positive electrode for a lithium secondary battery. In addition, the lithium secondary battery may selectively further include a battery case accommodating an electrode assembly of the positive electrode, the negative electrode, and the separator, and a sealing member sealing the battery case.

In the lithium secondary battery, the negative electrode includes a negative electrode current collector and a negative electrode active material layer positioned on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may have a thickness of 3 to 500 μm, and like the positive electrode current collector, fine irregularities may be formed on a surface of the current collector to increase the binding force of the negative electrode active material. For example, the negative electrode current collector may be used in various forms including a film, a sheet, a foil, a net, a porous body, a foamed body, a non-woven fabric, and the like.

The negative electrode active material layer selectively includes a binder and a conductive material as well as the negative electrode active material. The negative electrode material layer may be prepared, for example, by coating the negative electrode current collector with a composition for forming a negative electrode, which includes a negative electrode active material, and selectively a binder and a conductive material, drying or casting the composition for forming a negative electrode on a separate support, and laminating a film peeled from the support on the negative electrode current collector.

As the negative electrode active material, a compound enabling reversible intercalation and deintercalation of lithium may be used. Specific examples thereof may include carbonaceous materials such as artificial graphite, natural graphite, graphitized carbon fiber and amorphous carbon; metallic compounds capable of alloying with lithium such as Si, Al, Sn, Pb, Zn, Bi, In, Mg, Ga, Cd, Si alloys, Sn alloys or Al alloys; metal oxides capable of doping and dedoping lithium such as SiO$\beta$ (0<$\beta$<2), SnO$_2$, vanadium oxides, and lithium vanadium oxides; or composites including the metallic compound and the carbonaceous compound such as Si—C composites or Sn—C composites, which may be used alone or in a mixture of two or more thereof. In addition, as the negative electrode active material, a metal lithium thin film may be used. In addition, both low-crystalline carbon and high-crystalline carbon may be used as a carbon material. Representative examples of the low-crystalline carbon include soft carbon and hard carbon, and representative examples of the high-crystalline carbon include high temperature calcined carbon such as amorphous, sheet-type, flake-type, spherical or fiber-type natural or artificial graphite, Kish graphite, pyrolytic carbon, mesophase pitch-based carbon fiber, meso-carbon microbeads, mesophase pitches, and petroleum or coal tar pitch derived cokes.

Further, the binder and the conductive material may be the same as those described above for the positive electrode.

Meanwhile, in the lithium secondary battery, the separator is not particularly limited as long as it is generally used in a lithium secondary battery to separate a negative electrode from a positive electrode and provide a moving path for lithium ions, and particularly, it is preferred that the separator have low resistance to ion movement of an electrolyte and an excellent ability to impregnate an electrolyte solution. Specifically, a porous polymer film, for example, a porous polymer film formed of a polyolefin-based polymer such as an ethylene homopolymer, a propylene homopolymer, an ethylene/butene copolymer, an ethylene/hexene copolymer and an ethylene/methacrylate copolymer, or a stacked structure having two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength and may be selectively used in a single- or multi-layered structure.

Further, as the electrolyte used in the present invention, an organic liquid electrolyte, an inorganic liquid electrolyte, a solid polymer electrolyte, a gel-type polymer electrolyte, a solid inorganic electrolyte, or a molten inorganic electrolyte, which may be used in manufacturing a lithium secondary battery, may be used, but the present invention is not limited thereto.

Specifically, the electrolyte may include an organic solvent and a lithium salt.

The organic solvent is not particularly limited as long as it can serve as a medium enabling the movement of ions involved in an electrochemical reaction of a battery. Specifically, the organic solvent may be ester-based solvents such as methyl acetate, ethyl acetate, γ-butyrolactone, and ¿-caprolactone; ether-based solvents such as dibutyl ether and tetrahydrofuran; ketone-based solvents such as cyclohexanone; aromatic hydrocarbon-based solvents such as benzene and fluorobenzene; carbonate-based solvents such as dimethyl carbonate (DMC), diethyl carbonate (DEC), methyl ethyl carbonate (MEC), ethyl methyl carbonate (EMC), ethylene carbonate (EC), and propylene carbonate (PC); alcohol-based solvents such as ethyl alcohol and isopropyl alcohol; nitriles such as R—CN (R is a straight, branched, or cyclic hydrocarbon group of C2 to C20 and may include a double-bond, aromatic ring or an ether bond); amides such as dimethylformamide; dioxanes such as 1,3-dioxolane; sulfolanes; and the like. Among these, a carbonate-based solvent is preferably used, and a mixture of a cyclic carbonate having high ion conductivity and high permittivity to increase the charge/discharge performance of a battery (for example, ethylene carbonate or propylene carbonate) and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of about 1:1 to about 1:9, the electrolyte solution may exhibit excellent performance.

The lithium salt may be used without particular limitation as long as it is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used as the lithium salt. The concentration of the lithium salt is preferably in a range of 0.1 to 2.0M. When the concentration of the lithium salt is within the above-described range, the electrolyte has suitable conductivity and viscosity, so that it may exhibit excellent electrolyte performance and the lithium ion may effectively move.

In addition to the above-described components of the electrolyte, one or more additives such as a haloalkylene carbonate-based compound such as difluoroethylene carbonate and the like; or pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinones, N,N-substituted imidazolidines, ethylene glycol dialkyl ethers, ammonium salts, pyrrole, 2-methoxyethanol, aluminum trichloride or the like may be added to the electrolyte for the purpose of improving the lifespan characteristics of the battery, suppressing a reduction in battery capacity, and improving the discharge capacity of the battery. Here, the additive may be included in an amount of 0.1 to 5 wt % based on the total weight of the electrolyte.

As described above, since the lithium secondary battery including the positive electrode active material for a lithium secondary battery according to the present invention stably exhibits excellent discharge capacity, excellent output characteristics, and an excellent capacity retention rate, it may be useful in the field of portable devices such as mobile phones, notebook computers and digital cameras, and the field of electric vehicles such as hybrid electric vehicles (HEV), and the like.

Accordingly, the present invention provides a battery module including the lithium secondary battery as a unit cell and a battery pack including the battery module.

The battery module or the battery pack may be used as a power supply of a medium to large sized device of any one or more of power tools; electric vehicles including electric vehicles (EV), hybrid electric vehicles and plug-in hybrid electric vehicles (PHEV); or systems for power storage.

Hereinafter, examples of the present invention will be described in detail with reference to the accompanying drawings so that those of ordinary skill in the art can easily carry out the present invention. However, the present invention may be embodied in various different forms and is not limited to the examples described below.

EXAMPLES

Example 1

A precursor mixture was prepared by mixing $Ni_{0.65}Co_{0.15}Mn_{0.20}(OH)_2$ as a transition metal hydroxide precursor, $Co(OH)_2$ as a cobalt doping source, and $TiO_2$ as a titanium doping source. Here, the cobalt doping source was mixed at 0.53 parts by weight with respect to 100 parts by weight of the transition metal hydroxide precursor, and the titanium doping source was mixed at 0.1 parts by weight with respect to 100 parts by weight of the transition metal hydroxide precursor.

Subsequently, the precursor mixture was mixed with $Li_2CO_3$ as a lithium precursor by controlling a ratio (Li/Me) of the number of moles of lithium (Li) to the total number of moles of transition metals (nickel, cobalt, and manganese) in the transition metal hydroxide precursor to be 1.06, and the resulting mixture was subjected to a first heat treatment at 750° C. for five hours in an oxygen atmosphere.

A second heat treatment was carried out at 870° C. for 10 hours in an oxygen atmosphere after the first heat treatment, and the mixture was pulverized and classified to prepare a positive electrode active material for a lithium secondary battery of Example 1 in which an average particle size ($D_{50}$) was 15 μm and cobalt and titanium were doped into the lithium composite transition metal oxide.

Here, the cobalt was doped into the lithium composite transition metal oxide at 3,000 ppm with respect to the total weight of the lithium composite transition metal oxide, and the titanium was doped into the lithium composite transition metal oxide at 600 ppm with respect to the total weight of the lithium composite transition metal oxide. In addition, crystallite sizes of the positive electrode active material for a lithium secondary battery in an a-axis direction and a c-axis direction measured by XRD analysis were 2.8699 Å and 14.2339 Å, respectively.

Example 2

A precursor mixture was prepared by mixing $Ni_{0.65}Co_{0.15}Mn_{0.20}(OH)_2$ as a transition metal hydroxide precursor, $Co(OH)_2$ as a cobalt doping source, and $TiO_2$ as a titanium doping source. Here, the cobalt doping source was mixed at 0.53 parts by weight with respect to 100 parts by weight of the transition metal hydroxide precursor, and the titanium doping source was mixed at 0.05 parts by weight with respect to 100 parts by weight of the transition metal hydroxide precursor.

The precursor mixture was mixed with $Li_2CO_3$ as a lithium precursor by controlling a ratio (Li/Me) of the number of moles of lithium (Li) to the total number of moles of transition metals (nickel, cobalt, and manganese) in the transition metal hydroxide precursor to be 1.06, and the resulting mixture was subjected to a first heat treatment at 750° C. for five hours in an oxygen atmosphere.

A second heat treatment was carried out at 870° C. for 10 hours in an oxygen atmosphere after the first heat treatment, and the mixture was pulverized and classified to prepare a positive electrode active material for a lithium secondary battery of Example 2 in which an average particle size ($D_{50}$) was 15 μm and cobalt and titanium were doped into the lithium composite transition metal oxide.

Here, the cobalt was doped into the lithium composite transition metal oxide at 3,000 ppm with respect to the total weight of the lithium composite transition metal oxide, and the titanium was doped into the lithium composite transition metal oxide at 300 ppm with respect to the total weight of the lithium composite transition metal oxide. In addition, crystallite sizes of the positive electrode active material for a lithium secondary battery in an a-axis direction and a c-axis direction measured by XRD analysis were 2.8698 Å and 14.2278 Å, respectively.

Example 3

A positive electrode active material for a lithium secondary battery of Example 3 was prepared in the same manner as in Example 1, except that the cobalt doping source was mixed at 0.53 parts by weight with respect to 100 parts by weight of the transition metal hydroxide precursor, and the titanium doping source was mixed at 0.034 parts by weight with respect to 100 parts by weight of the transition metal hydroxide precursor.

Here, the cobalt was doped into the lithium composite transition metal oxide at 3,000 ppm with respect to the total weight of the lithium composite transition metal oxide, and the titanium was doped into the lithium composite transition metal oxide at 200 ppm with respect to the total weight of the lithium composite transition metal oxide.

In addition, crystallite sizes of the positive electrode active material for a lithium secondary battery in an a-axis direction and a c-axis direction measured by XRD analysis were 2.8658 Å and 14.2098 Å, respectively.

Example 4

A positive electrode active material for a lithium secondary battery of Example 4 was prepared in the same manner as in Example 1, except that the cobalt doping source was mixed at 0.53 parts by weight with respect to 100 parts by weight of the transition metal hydroxide precursor, and the titanium doping source was mixed at 0.17 parts by weight with respect to 100 parts by weight of the transition metal hydroxide precursor.

Here, the cobalt was doped into the lithium composite transition metal oxide at 3,000 ppm with respect to the total weight of the lithium composite transition metal oxide, and the titanium was doped into the lithium composite transition metal oxide at 1,000 ppm with respect to the total weight of the lithium composite transition metal oxide.

In addition, crystallite sizes of the positive electrode active material for a lithium secondary battery in an a-axis direction and a c-axis direction measured by XRD analysis were 2.8711 Å and 14.2319 Å, respectively.

Comparative Example 1

A precursor mixture was prepared by mixing $Ni_{0.65}Co_{0.15}Mn_{0.20}(OH)_2$ as a transition metal hydroxide precursor and $ZrO_2$ as a zirconium doping source. Here, the zirconium doping source was mixed at 0.63 parts by weight with respect to 100 parts by weight of the transition metal hydroxide precursor.

Subsequently, the precursor mixture was mixed with $Li_2CO_3$ as a lithium precursor by controlling a ratio (Li/Me) of the number of moles of lithium (Li) to the total number of moles of transition metals (nickel, cobalt, and manganese) in the transition metal hydroxide precursor to be 1.06, and the resulting mixture was subjected to a first heat treatment at 750° C. for five hours in an oxygen atmosphere.

A second heat treatment was carried out at 870° C. for 10 hours in an oxygen atmosphere after the first heat treatment, and the mixture was pulverized and classified to prepare a positive electrode active material for a lithium secondary battery of Comparative Example 1 in which an average particle size ($D_{50}$) was 15 μm and zirconium was doped into the lithium composite transition metal oxide. The zirconium was doped into the lithium composite transition metal oxide at 3,600 ppm with respect to the total weight of the lithium composite transition metal oxide.

In addition, crystallite sizes of the positive electrode active material for a lithium secondary battery in an a-axis direction and a c-axis direction measured by XRD analysis were 2.8732 Å and 14.2390 Å, respectively.

Comparative Example 2

A precursor mixture was prepared by mixing $Ni_{0.65}Co_{0.15}Mn_{0.20}(OH)_2$ as a transition metal hydroxide precursor, $Co(OH)_2$ as a cobalt doping source, and $ZrO_2$ as a zirconium doping sourcedoping source. At this time, the cobalt doping source was mixed at 0.53 parts by weight with respect to 100 parts by weight of the transition metal hydroxide precursor, and the zirconium doping source was mixed at 0.1 parts by weight with respect to 100 parts by weight of the transition metal hydroxide precursor.

Subsequently, the precursor mixture was mixed with $Li_2CO_3$ as a lithium precursor by controlling a ratio (Li/Me) of the number of moles of lithium (Li) to the total number of moles of transition metals (nickel, cobalt, and manganese) in the transition metal hydroxide precursor to be 1.06, and the resulting mixture was subjected to a first heat treatment at 750° C. for five hours in an oxygen atmosphere.

A second heat treatment was carried out at 870° C. for 10 hours in an oxygen atmosphere after the first heat treatment, and the mixture was pulverized and classified to prepare a positive electrode active material for a lithium secondary battery of Comparative Example 2 in which an average particle size ($D_{50}$) was 15 μm and cobalt and zirconium were doped into the lithium composite transition metal oxide. Here, the cobalt was doped into the lithium composite transition metal oxide at 3,000 ppm with respect to the total weight of the lithium composite transition metal oxide, and the zirconium was doped into the lithium composite transition metal oxide at 600 ppm with respect to the total weight of the lithium composite transition metal oxide.

In addition, crystallite sizes of the positive electrode active material for a lithium secondary battery in an a-axis direction and a c-axis direction measured by XRD analysis were 2.8728 Å and 14.2408 Å, respectively.

Comparative Example 3

A precursor mixture was prepared by mixing $Ni_{0.65}Co_{0.15}Mn_{0.20}(OH)_2$ as a transition metal hydroxide precursor, $ZrO_2$ as a zirconium doping source, and $TiO_2$ as a titanium doping source. Here, the zirconium doping source was mixed at 0.41 parts by weight with respect to 100 parts by weight of the transition metal hydroxide precursor, and the titanium doping source was mixed at 0.1 parts by weight with respect to 100 parts by weight of the transition metal hydroxide precursor.

Subsequently, the precursor mixture was mixed with $Li_2CO_3$ as a lithium precursor by controlling a ratio (Li/Me) of the number of moles of lithium (Li) to the total number of moles of transition metals (nickel, cobalt, and manganese) in the transition metal hydroxide precursor to be 1.06, and the resulting mixture was subjected to a first heat treatment at 750° C. for five hours in an oxygen atmosphere.

A second heat treatment was carried out at 870° C. for 10 hours in an oxygen atmosphere after the first heat treatment, and the mixture was pulverized and classified to prepare a positive electrode active material for a lithium secondary battery of Comparative Example 3 in which an average particle size ($D_{50}$) was 15 μm and zirconium and titanium were doped into the lithium composite transition metal oxide. Here, the zirconium was doped into the lithium composite transition metal oxide at 3,000 ppm with respect to the total weight of the lithium composite transition metal oxide, and the titanium was doped into the lithium composite transition metal oxide at 600 ppm with respect to the total weight of the lithium composite transition metal oxide.

In addition, crystallite sizes of the positive electrode active material for a lithium secondary battery in an a-axis direction and a c-axis direction measured by XRD analysis were 2.8729 Å and 14.2373 Å, respectively.

Comparative Example 4

A positive electrode active material for a lithium secondary battery of Comparative Example 4 was prepared in the same manner as in Example 1, except that the cobalt doping source was mixed at 0.35 parts by weight with respect to 100 parts by weight of the transition metal hydroxide precursor, and the titanium doping source was mixed at 0.1 parts by weight with respect to 100 parts by weight of the transition metal hydroxide precursor.

Here, the cobalt was doped into the lithium composite transition metal oxide at 2,000 ppm with respect to the total weight of the lithium composite transition metal oxide, and the titanium was doped into the lithium composite transition metal oxide at 600 ppm with respect to the total weight of the lithium composite transition metal oxide.

In addition, crystallite sizes of the positive electrode active material for a lithium secondary battery in an a-axis direction and a c-axis direction measured by XRD analysis were 2.8728 Å and 14.2378 Å, respectively.

Comparative Example 5

A positive electrode active material for a lithium secondary battery of Comparative Example 5 was prepared in the same manner as in Example 1, except that the cobalt doping source was mixed at 0.88 parts by weight with respect to 100 parts by weight of the transition metal hydroxide precursor, and the titanium doping source was mixed at 0.101 parts by weight with respect to 100 parts by weight of the transition metal hydroxide precursor.

Here, the cobalt was doped into the lithium composite transition metal oxide at 5,000 ppm with respect to the total weight of the lithium composite transition metal oxide, and the titanium was doped into the lithium composite transition metal oxide at 600 ppm with respect to the total weight of the lithium composite transition metal oxide.

In addition, crystallite sizes of the positive electrode active material for a lithium secondary battery in an a-axis direction and a c-axis direction measured by XRD analysis were 2.8719 Å and 14.2327 Å, respectively.

The doping elements and contents of the Examples and Comparative Examples are shown in Table 1 below.

TABLE 1

| Classification | Ratio of number of moles of Li to total number of moles of transition metal (Li/Me) | Doping element | Weight of doping element with respect to total weight of lithium composite transition metal oxide (ppm) |
|---|---|---|---|
| Example 1 | 1.06 | Co | 3000 |
| | | Ti | 600 |
| Example 2 | 1.06 | Co | 3000 |
| | | Ti | 300 |
| Example 3 | 1.06 | Co | 3000 |
| | | Ti | 200 |
| Example 4 | 1.06 | Co | 3000 |
| | | Ti | 1000 |
| Comparative Example 1 | 1.06 | Zr | 3600 |

TABLE 1-continued

| Classification | Ratio of number of moles of Li to total number of moles of transition metal (Li/Me) | Doping | |
|---|---|---|---|
| | | Doping element | Weight of doping element with respect to total weight of lithium composite transition metal oxide (ppm) |
| Comparative Example 2 | 1.06 | Co | 3000 |
| | | Zr | 600 |
| Comparative Example 3 | 1.06 | Zr | 3000 |
| | | Ti | 600 |
| Comparative Example 4 | 1.06 | Co | 2000 |
| | | Ti | 600 |
| Comparative Example 5 | 1.06 | Co | 5000 |
| | | Ti | 600 |

Experimental Example 1: Measurement of Thicknesses of Lithium Layer and Transition Metal Layer The positive electrode active materials for a lithium secondary battery of Examples 1 to 4 and Comparative Examples 1 to 5 were analyzed by XRD, XRD data was fitted using the Fullprof program, and then the thickness of each of lithium layers and transition metal layers of the positive electrode active materials for a lithium secondary battery of the Examples and Comparative Examples was measured by the ATOMS program, the results of which are shown in Table 2 below.

TABLE 2

| Classification | Thickness | |
|---|---|---|
| | Lithium layer (Å) | Transition metal layer (Å) |
| Example 1 | 2.1695 | 2.5729 |
| Example 2 | 2.1663 | 2.5761 |
| Example 3 | 2.1590 | 2.5830 |
| Example 4 | 2.1650 | 2.5782 |
| Comparative Example 1 | 2.1322 | 2.6128 |
| Comparative Example 2 | 2.1222 | 2.6215 |
| Comparative Example 3 | 2.1299 | 2.6067 |
| Comparative Example 4 | 2.1320 | 2.6100 |
| Comparative Example 5 | 2.1319 | 2.6098 |

<Manufacture of Lithium Secondary Battery>

Each of the positive electrode active materials prepared according to Examples 1 to 4 and Comparative Examples 1 to 5, carbon black as a conductive material, and PVdF as a binder were mixed in N-methyl pyrrolidone as a solvent at a weight ratio of 96.5:1.5:2 to prepare a positive electrode mixture (viscosity: 5,000 mPa·s), and the mixture was coated on one surface of an aluminum current collector, dried at 130° C., and then rolled to manufacture a positive electrode.

Natural graphite as a negative electrode active material, carbon black as a conductive material, and PVdF as a binder were mixed in N-methyl pyrrolidone as a solvent at a weight ratio of 85:10:5 to prepare a composition for forming a negative electrode, and the composition was coated on one surface of a copper current collector to manufacture a negative electrode.

A lithium secondary battery was manufactured by manufacturing an electrode assembly by interposing a separator of porous polyethylene between the positive electrode and the negative electrode, which were manufactured as described above, placing the electrode assembly in a case, and injecting an electrolyte solution into the case. Here, the electrolyte solution was prepared by dissolving 1.0M lithium hexafluorophosphate ($LiPF_6$) in an organic solvent consisting of ethylene carbonate/dimethyl carbonate/ethyl methyl carbonate (mixing volume ratio of EC/DMC/EMC=3/4/3).

Experimental Example 2: Evaluation of Capacity Characteristics

The lithium secondary batteries of the Examples and Comparative Examples manufactured as described above were charged at a constant current of 0.1 C until 4.3V and discharged until 3.0V at a constant current of 0.1 C to measure charge capacity, discharge capacity, and efficiency, thereby confirming charge/discharge characteristics. The results are shown in FIG. 1 and Table 3 below.

TABLE 3

| | Charge capacity (mAh/g) | Discharge capacity (mAh/g) | Efficiency (%) |
|---|---|---|---|
| Example 1 | 207.6 | 189.1 | 91.1 |
| Example 2 | 206.4 | 188.7 | 91.4 |
| Example 3 | 207.0 | 186.7 | 90.2 |
| Example 4 | 206.5 | 188.6 | 91.3 |
| Comparative Example 1 | 206.3 | 183.5 | 88.9 |
| Comparative Example 2 | 206.4 | 182.8 | 88.6 |
| Comparative Example 3 | 206.2 | 181.7 | 88.1 |
| Comparative Example 4 | 205.8 | 184.9 | 89.8 |
| Comparative Example 5 | 206.3 | 185.2 | 89.8 |

Referring to FIG. 1 and Table 3, it was confirmed that in the case of the positive electrode active materials for a lithium secondary battery of the Examples in which cobalt and titanium were doped, and the thickness of each of the lithium layers and the transition metal layers was implemented within the above-described range, the lithium secondary batteries manufactured therewith have a high charge/discharge capacity, and the efficiency was also improved to an excellent level.

However, it was confirmed that the lithium secondary batteries manufactured with the positive electrode active materials of the Comparative Examples show poor results in terms of charge/discharge capacity and efficiency as compared with those of the Examples.

Experimental Example 3: Evaluation of Cycle Characteristics

The lithium secondary batteries of the Examples and Comparative Examples manufactured as described above were subjected to 400 cycles of charge/discharge at high temperature (45° C.) in a driving voltage range from 3.0 V to 4.25V under conditions of 1 C/1 C, and a cycle capacity retention ratio, which is a ratio of the discharge capacity at the 400th cycle to the discharge capacity of the first cycle, was measured. The measurement results are shown in FIG. 2 and Table 4 below.

TABLE 4

| | Cycle capacity retention rate after 400 cycles at 45° C. (%) |
|---|---|
| Example 1 | 90.2 |
| Example 2 | 88.5 |
| Example 3 | 86.7 |
| Example 4 | 85.8 |
| Comparative Example 1 | 76.3 |
| Comparative Example 2 | 76.8 |
| Comparative Example 3 | 79.2 |
| Comparative Example 4 | 80.5 |
| Comparative Example 5 | 80.1 |

Figure 2:
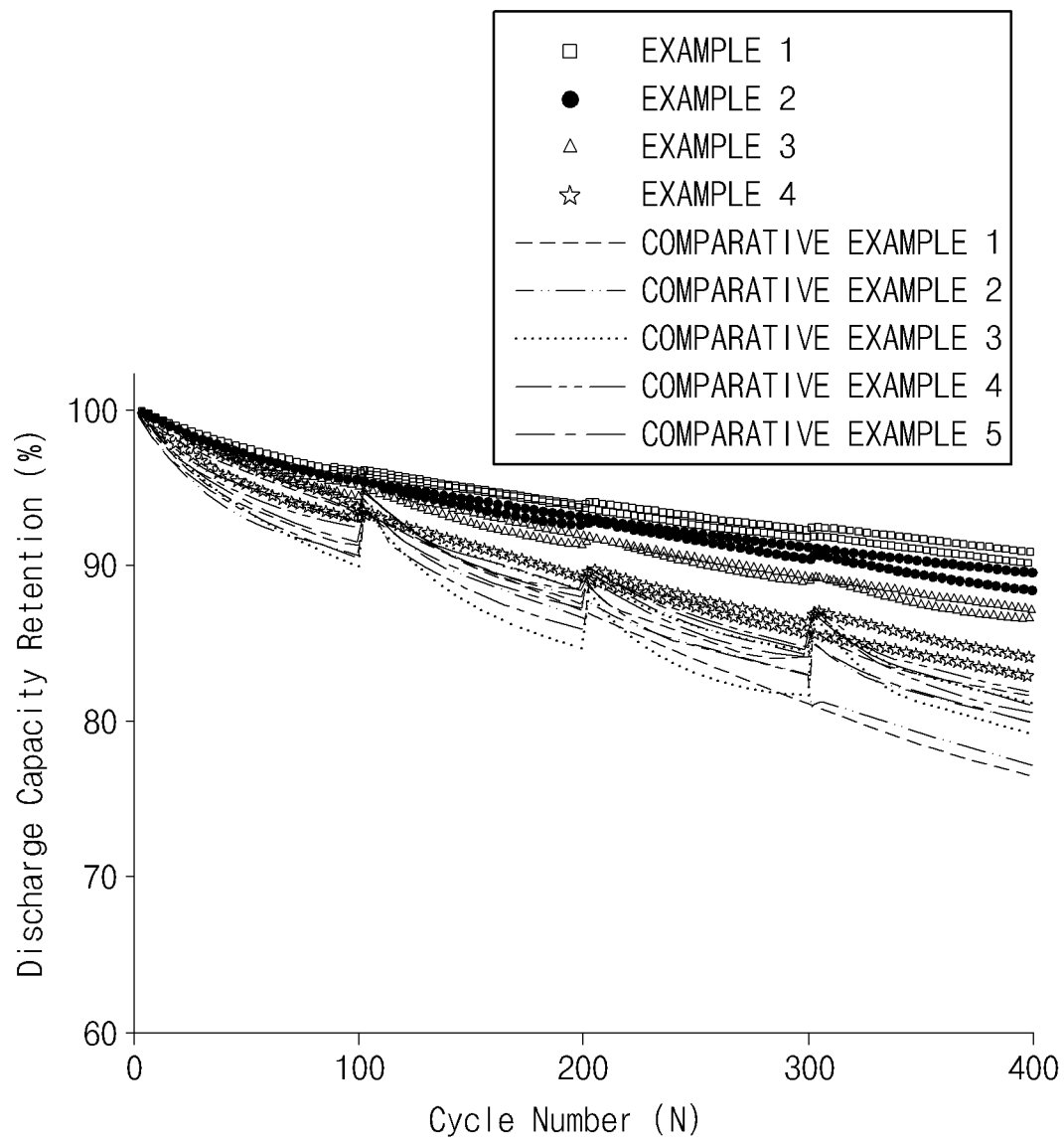
FIG. 2 is a graph illustrating the evaluation of cycle characteristics of the lithium secondary batteries of the Examples and Comparative Examples.

Referring to FIG. 2 and Table 4, it was confirmed that in the case of the positive electrode active materials for a lithium secondary battery of the Examples in which cobalt and titanium were doped, and the thickness of each of the lithium layers and the transition metal layers was implemented within the above-described range, thermal stability and structural stability were improved so that the lithium secondary batteries manufactured therewith show excellent cycle characteristics.

However, it was confirmed that the lithium secondary batteries manufactured with the positive electrode active materials of the Comparative Examples have poor cycle characteristics as compared with those of the Examples.

Experimental Example 4: Evaluation of Low-Temperature Output Characteristics

Figure 3:
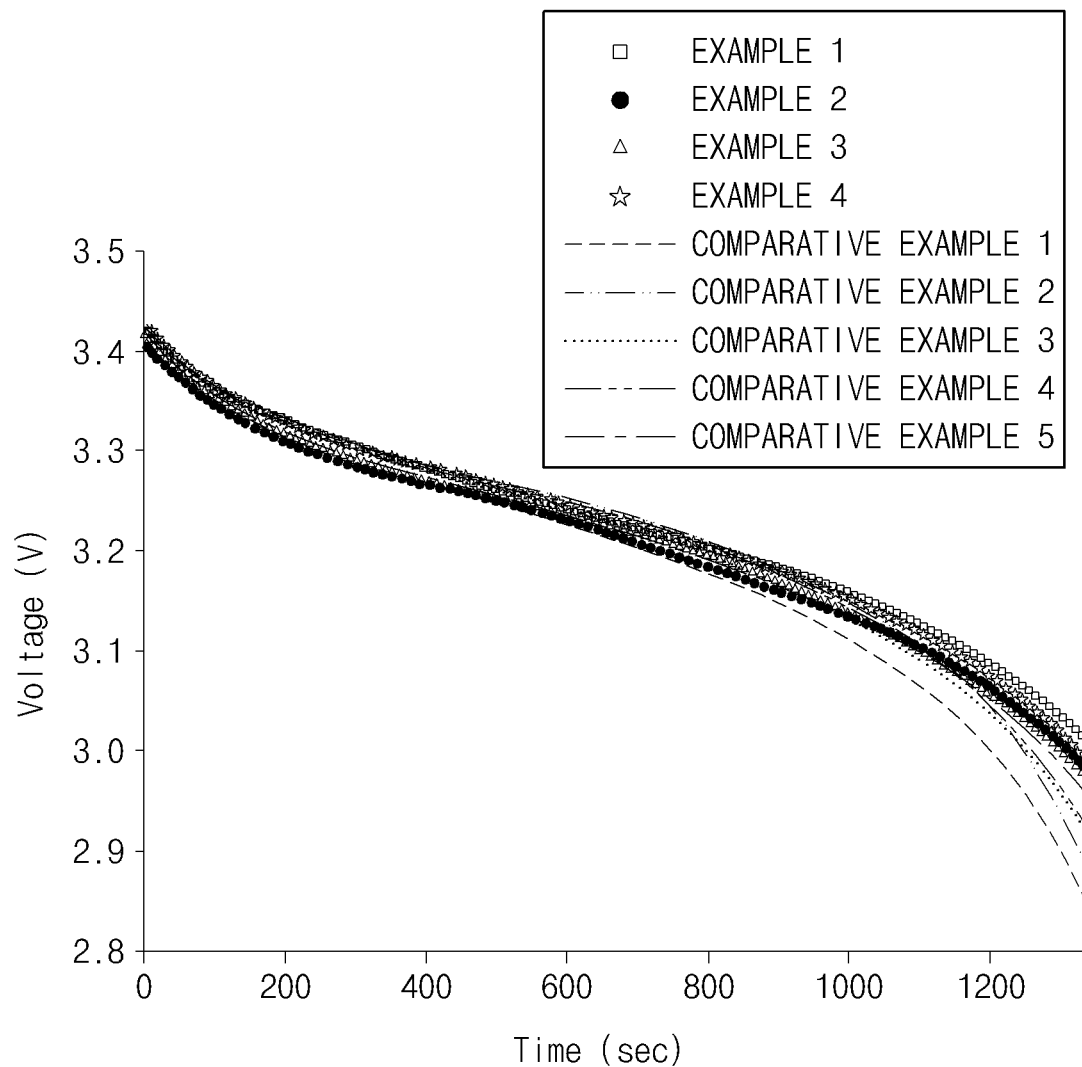
FIG. 3 is a graph illustrating the evaluation of low-temperature output characteristics of the lithium secondary batteries of the Examples and Comparative Examples.

A low-temperature voltage drop (ΔV) and a low-temperature resistance (Ω) were measured with a voltage difference generated by discharging each of the lithium secondary batteries, which were manufactured as described above with the positive electrode active materials for a lithium secondary battery of the Examples and Comparative Examples prepared as described above, until 3 V in a state of charge (SOC) of 20% at 0.6 C and −25° C. to evaluate output characteristics, the results of which are shown in FIG. 3 and Table 5 below.

TABLE 5

| | Low-temperature (−25° C.) voltage drop (ΔV) | Low-temperature (−25° C.) resistance (Ω) |
|---|---|---|
| Example 1 | −0.623 | 38.63 |
| Example 2 | −0.626 | 40.19 |
| Example 3 | −0.673 | 41.57 |
| Example 4 | −0.649 | 40.82 |
| Comparative Example 1 | −0.800 | 50.75 |
| Comparative Example 2 | −0.762 | 46.52 |
| Comparative Example 3 | −0.724 | 44.98 |
| Comparative Example 4 | −0.723 | 44.66 |
| Comparative Example 5 | −0.674 | 41.36 |

Referring to FIG. 3 and Table 5, it was confirmed that in the case of the positive electrode active materials for a lithium secondary battery of the Examples in which cobalt and titanium were doped, and the thickness of each of the lithium layers and the transition metal layers were implemented within the above-described range, transfer resistance of lithium was reduced so that the lithium secondary batteries manufactured therewith show excellent output characteristics.

However, it was confirmed that the lithium secondary batteries manufactured with the positive electrode active materials of the Comparative Examples have higher resistance and poor output characteristics as compared with those of the Examples.

The invention claimed is:

1. A positive electrode active material for a lithium secondary battery comprising:
a lithium composite transition metal oxide comprising transition metals including nickel (Ni), cobalt (Co), and manganese (Mn),
wherein the lithium composite transition metal oxide is doped with doping elements including cobalt (Co) and titanium (Ti),
wherein the lithium composite transition metal oxide is represented by Chemical Formula 1:

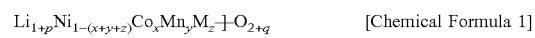

$$Li_{1+p}Ni_{1-(x+y+z)}Co_xMn_yM_z O_{2+q} \quad \text{[Chemical Formula 1]}$$

wherein $0 \leq p \leq 0.5$, $0 < x \leq 0.3$, $0 < y \leq 0.3$, $0 < z \leq 0.1$, $-0.2 \leq q \leq 0.2$, and $0 < x+y+z \leq 0.4$, and M is the doping elements,
the lithium composite transition metal oxide includes at least one lithium layer and at least one transition metal layer including the transition metals,
the lithium layer and the transition metal layer are alternately arranged,
a thickness of the lithium layer ranges from 2.146 Å to 2.182 Å, and
a thickness of the transition metal layer ranges from 2.561 Å to 2.595 Å, and
wherein, among the doping elements, the cobalt is included in an amount from 2,500 ppm to 4,500 ppm with respect to a total weight of the lithium composite transition metal oxide, and the titanium is included in an amount from 100 ppm to 1,000 ppm with respect to the total weight of the lithium composite transition metal oxide.

2. The positive electrode active material of claim 1, wherein a crystallite size in an a-axis direction ranges from 2.862 Å to 2.8715 Å and a crystallite size in a c-axis direction ranges from 14.220 Å to 14.236 Å, which are measured by X-ray diffraction (XRD) analysis.

3. The positive electrode active material of claim 1, wherein the doping elements include the cobalt and titanium at a weight ratio of 75:25 to 95:5.

4. The positive electrode active material of claim 1, wherein an average particle size (D50) of the positive electrode active material is in a range of 9 μm to 20 μm.

5. The positive electrode active material of claim 1, wherein a ratio (Li/Me) of the number of moles of lithium to the total number of moles of the transition metals of the lithium composite transition metal oxide is in a range of 1 to 1.5.

6. A method of preparing the positive electrode active material of claim 1, the method comprising:
preparing a precursor mixture by mixing a transition metal hydroxide precursor including transition metals including nickel (Ni), cobalt (Co), and manganese (Mn), a cobalt doping source, and a titanium doping source;
mixing the precursor mixture with a lithium precursor and performing a first heat treatment at 600° C. to 900° C.; and
preparing a lithium composite transition metal oxide by performing a second heat treatment at 800° C. to 1,000° C. after the first heat treatment, and wherein, cobalt is doped into the lithium composite transition metal oxide at 2,500 ppm to 4,500 ppm with respect to a total weight of the lithium composite transition metal oxide, and titanium is doped into the lithium composite transition metal oxide at 100 ppm to 1,000 ppm with respect to the total weight of the lithium composite transition metal oxide.

7. The method of claim 6, wherein the cobalt doping source is mixed at 0.43 parts by weight to 0.8 parts by weight with respect to 100 parts by weight of the transition metal hydroxide precursor, and the titanium doping source is mixed at 0.03 parts by weight to 0.2 parts by weight with respect to 100 parts by weight of the transition metal hydroxide precursor.

8. The method of claim 6, wherein the cobalt doping source and the titanium doping source are mixed at a weight ratio of 75:25 to 95:5.

9. A positive electrode for a lithium secondary battery comprising the positive electrode active material of claim 1.

10. A lithium secondary battery comprising the positive electrode of claim 9.

\* \* \* \* \*